March 14, 1961  R. W. WELCH  2,974,329
COMBINATION WINDSHIELD AND SPRAY CURTAIN
Filed March 2, 1959

INVENTOR.
RICHARD W. WELCH
BY
ATTORNEY

United States Patent Office 2,974,329
Patented Mar. 14, 1961

2,974,329

COMBINATION WINDSHIELD AND SPRAY CURTAIN

Richard W. Welch, R.D. 4, Moorheadville Road, North East, Pa.

Filed Mar. 2, 1959, Ser. No. 796,318

1 Claim. (Cl. 9—1)

This invention relates to boat windshields and, more particularly, to an improved design capable of being dismantled and stored when not in use.

The invention disclosed herein also provides unobstructed visibility and complete protection from wind driven spray and rain.

Windshields of the type now used on boats offer little, if any, protection from spray driven by winds and no protection from rain. The present invention gives the advantages which can only be obtained by use of a windshield and a canopy. The windshield disclosed herein gives complete protection from rain and from spray which comes up and then over the top to the occupants in the boat. At the same time, wind driven spray is fended off.

It is, accordingly, an object of this invention to provide a spray hood which will give complete protection to the occupants of a boat from wind, rain, and spray.

Another object of the invention is to provide a spray hood which will give the occupants of a boat complete protection, yet no undesirable blind spots in visibility.

A further object of the invention is to provide a spray hood which is compact and which can be stored compactly and in a minimum space when dismantled.

Still a further object of the invention is to provide a spray hood which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 4:
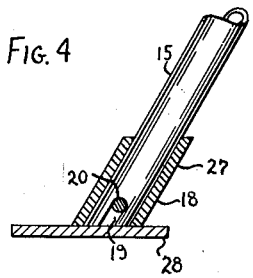
Fig. 4 is an enlarged cross sectional view of the socket.
Figure 5:
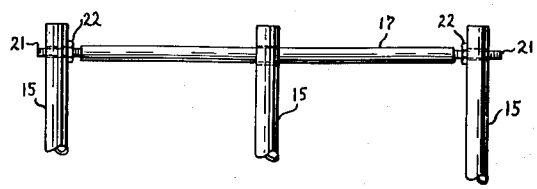
Fig. 5 is an enlarged view of the tubing with the brace attached thereto.
Figure 3:
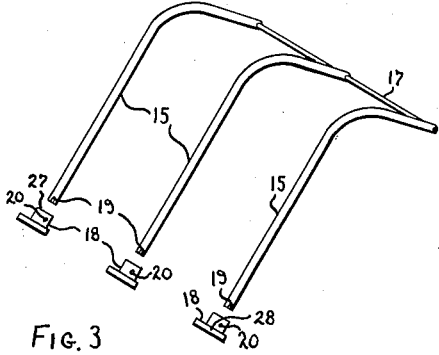
Fig. 3 is an isometric view of the tubular frame and sockets of the windshield.
Figure 2:
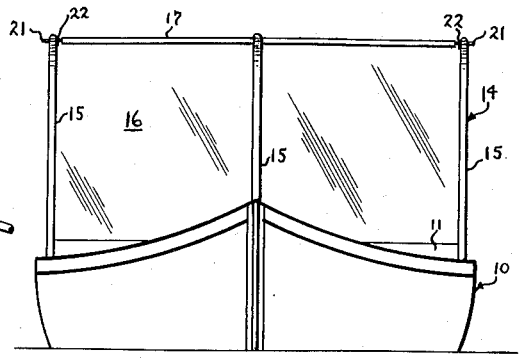
Fig. 2 is a front view of the windshield shown in Fig. 1.
Figure 1:
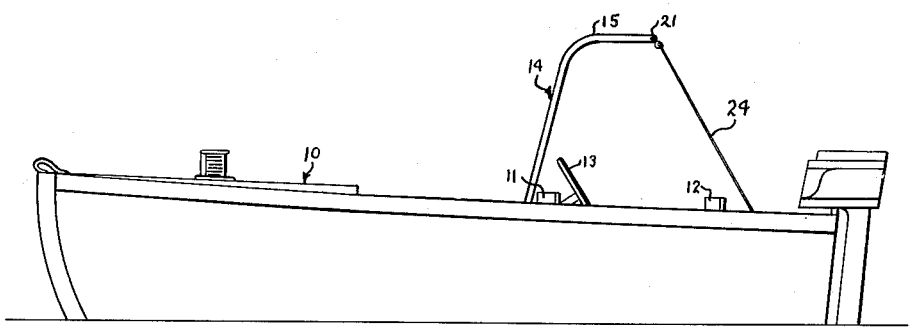
Fig. 1 is a side view of a windshield mounted on a boat according to the invention.
Figure 6:
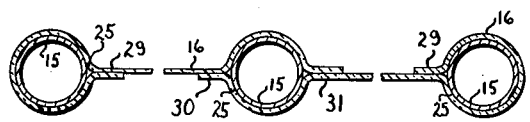
Fig. 6 is a cross sectional view of the plastic fitted about the tubing.

Now with more particular reference to the drawing, a boat 10 is shown with an improved windshield 14 supported thereon. The windshield 14 is made up of an elongated tubular support member 15, a transverse bar 17, and plastic material 16. Mounting sockets 18 are attached to the boat 10. The sockets 18 have a hollow cylindrical portion 27 with an elongated flange type base 28 which is mounted on the flat surface of the gunwale of the boat 10. The cylindrical portion 27 of the sockets 18 is attached to the member 28 at an angle of approximately sixty degrees and attached to the member 28 by welding or the like.

Pins 20 extend through holes in the cylindrical portions 27 and the ends may be riveted to hold the pins 20 in place. The pin 20 is received in a slot 19 in the lower ends of the support members 15. The support members 15 are received in the hollow of the cylindrical member 27 as shown in Fig. 4.

The support members 15 extend upwardly at an angle of approximately seventy degrees and the upper portions are bent rearwardly and extend rearwardly generally with the deck of the boat 10. The distal ends of the support members 15 are connected by the bar 17. The ends of the bar 17 have threaded members 21 fixed thereto which extend through holes in the support members 15. The intermediate member 15 has a bore which receives the bar 17.

The plastic material 16 is hemmed at each edge by turning the material 16 back on itself and fastening it at 29 as by heat sealing. This forms passages 25 for receiving the support members 15. The material 16 overlaps at the center and is attached along spaced seams at 30 and 31, leaving a support receiving opening to receive the tubular passage 25.

The threaded members 21 receive nuts 22 which clamp the support members 15 firmly to the bar 17. A nylon tie-down 24 is fastened to the deck 10 and at the outer distal ends of the support members 15.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

In combination, a spray curtain and a windshield and a boat having seats, said windshield comprising a sheet of material made of two parts overlapping at the center and sealed along two spaced lines to provide a support receiving opening, the edges spaced from said spaced lines and parallel to said lines being turned back on themselves and sealed along a line generally parallel to said lines to provide support receiving openings, three elongated, generally L-shaped supports disposed in said openings, said supports being supported on the front end of said boat ahead of the seats and extending upwardly, then bent and extending rearwardly to overlie the front part of said boat, means for attaching said supports to said boat, said means comprising a hollow cylindrical member for receiving one end of each said support, a laterally extending pin in each said cylindrical member, a slot in the end of each said support receiving said pin, and a flat flange member attached to one end of each said cylindrical member, said flange members having holes therein for attaching them to said boat, said flange members being disposed in a plane at less than a right angle to the axes of said elongated supports.

References Cited in the file of this patent

UNITED STATES PATENTS

| | | |
|---|---|---|
| 1,239,916 | Jose | Sept. 11, 1917 |
| 1,843,874 | Hulst | Feb. 2, 1932 |
| 2,505,520 | Bills | Apr. 25, 1950 |
| 2,621,075 | Sedar | Dec. 9, 1952 |
| 2,757,965 | Andrews | Aug. 7, 1956 |